United States Patent
Tanaka

Patent Number: 5,422,606
Date of Patent: Jun. 6, 1995

[54] AUTOMATIC EQUALIZER

[75] Inventor: Yoshinori Tanaka, Kawasaki, Japan

[73] Assignee: Fujitsu Limited, Kanagawa, Japan

[21] Appl. No.: 52,392

[22] Filed: Apr. 23, 1993

[30] Foreign Application Priority Data

Apr. 23, 1992 [JP] Japan .................. 4-104659

[51] Int. Cl.$^6$ .................. H03G 11/00; H04B 3/14
[52] U.S. Cl. ........................ 333/18; 375/231
[58] Field of Search .............. 333/18; 375/11, 12, 375/13

[56] References Cited

U.S. PATENT DOCUMENTS

| 4,097,807 | 5/1978 | Fujimura | 325/42 |
| 4,607,230 | 8/1986 | Kaku et al. | 329/50 |
| 4,872,184 | 10/1984 | Yamaguchi | 375/14 |

FOREIGN PATENT DOCUMENTS 0007735 1/1986 Japan.

Primary Examiner—Benny Lee
Assistant Examiner—Darius Gambino

[57] ABSTRACT

An automatic equalizer includes a transversal filter having delay elements with N+1 taps and N+1 multipliers for outputting an output signal $Y_n$ which is described by the following formula (A) depending on a modulated input signal $X_n$ which is received via a transmission path and a coefficient $C_i^{(n)}$ of each of the multipliers which are arranged in a sequence such that an integer i increases from $-(N/2)$ to $(N/2)$ towards latter stages of the delay elements, $$Y_n = \sum_{i=-(N/2)}^{(N/2)} C_i^{(n)} \cdot X_{n-i-(N/2)} \quad (A)$$

a gain controller for multiplying a gain coefficient $g^{(n)}$ to the output signal $Y_n$ of the transversal filter to produce an equalizer output, and a control circuit responsive to the equalizer output for variably setting the coefficient $C_i^{(n)}$ of the transversal filter means described by the following formula (B) and the gain coefficient $g^{(n)}$ of the gain controller described by the following formula (C)

$$C_i^{(n+1)} = C_i^{(n)} + \alpha E_n^* X_{n-i-(N/2)} \quad (B)$$

$$g^{(n)} = g^{(n)} + \tau E_n^* Y_n \quad (C)$$

where $i \neq 0$, $E_n$ denotes an error of the output signal $Y_n$, $E_n^*$ denotes a complex conjugate of the error $E_n$, and $\alpha$ and $\tau$ denote scaler coefficients, so that a frequency distortion dependent on a transmission characteristic of the transmission path is compensated.

10 Claims, 6 Drawing Sheets

AUTOMATIC EQUALIZER

BACKGROUND OF THE INVENTION

The present invention generally relates to automatic equalizers, and more particularly to an automatic equalizer which compensates for a line distortion adaptively to the transmission characteristic of the line in a communication system which makes a digital transmission.

In a communication system which transmits digital transmission information via an analog line, a modem is provided at both the transmitting end and the receiving end for consistency of the transmission information and the line. The modem at the transmitting end sends a training signal prior to starting transmission of the transmission information. On the other hand, the modem at the receiving end carries out a series of initial pull-in control including reproduction of the carrier and receiving timing based on the received training signal to establish synchronization, and adjustment of an automatic equalizer adaptively to the transmission characteristic.

FIG. 1 shows an example of a conventional automatic equalizer. In FIG. 1, a received signal is supplied via a transversal filter 31 to a transmission information processor (not shown) and to one input of a multiplier 32 which are provided at the subsequent stage. An output of the multiplier 32 is supplied to an input of a discriminator 33 and to one input of a subtractor 34. An output of the subtractor 34 is supplied to an input of a carrier adaptive phase controller (CAPC) 35 and to one input of a multiplier 36. One output of the CAPC 35 is supplied to the other input of the multiplier 32, and the other input of the CAPC 35 is supplied to the other input of the multiplier 36. An output of the multiplier 36 is fed back to a feedback input of the transversal filter 31.

The transversal filter 35 includes delay elements $37_1$ through $37_N$ which are connected in series, multipliers $38_1$ through $38_{N+1}$, and an adder 39. The received signal is supplied to the delay element $37_1$. A plurality of taps provided at the input and output ends of the delay elements $37_1$ through $37_N$ are respectively coupled to inputs of the adder 39 via the multipliers $38_1$ through $38_{N+1}$. An output of the adder 39 is supplied to the transmission information processor and to the input of the multiplier 32, as described above.

In FIG. 1, it is assumed for the sake of convenience that a received signal $X_n$ is supplied to the transversal filter 31, where n increases with time. In addition, it is assumed that an output signal $Y_n$ is output from the transversal filter 31 in response to the received signal $X_n$. In this case, the multiplier 32 outputs a rotation signal which is obtained by shifting the phase of the output signal $Y_n$ by $\theta$ radians depending on the phase error information $\exp(j\theta)$ of the carrier which is detected by the CAPC 35. The discriminator 33 outputs a reference signal $Z_n$ which indicates a reference point which is closest to the above rotation signal out of all the reference points in the signal space which is dependent on the modulation technique of the received signal $X_n$.

The subtractor 34 outputs an equalizer error signal which indicates an error of the rotation signal with reference to the reference signal $Z_n$. The multiplier 36 shifts the phase of the equalizer error signal by $-\theta$ radians depending on the inverted phase error information $\exp(-j\theta)$ which is output from the CAPC 35. In other words, the multiplier 36 outputs a reference error signal $E_n$ by cancelling a phase shift component which is given to the signal $Y_n$ via the multiplier 32.

In the transversal filter 31, values of coefficients $C_{(-N/2)}$ through $C_{(N/2)}$ are varied depending on the reference error signal $E_n$. Hence, the amplitude distortion and the phase distortion of the received signal $X_n$ are compensated simultaneously depending on the transmission characteristic of the line.

In a mode which uses the above described automatic equalizer, the equalizer characteristic may greatly shift with respect to the line characteristic and diverge for some reason during reception of the transmission information after the initial pull-in control is completed. In such a case, the modem, in general, requests the modem at the remote end to retransmit the training signal in conformance with a predetermined communication procedure. Thereafter, the modem carries out the initial pull-in control again based on the training signal which is received from the remote modem in response to the retransmission request.

However, the modem may be applied to a multi-point communication system shown in FIG. 2 which includes a master station 41 and a plurality of slave stations $42_1$ through $42_M$ which are connected in parallel to a single 2-wire line which connects to the master station 41. In other words, the automatic equalizer may be applied to the modem of each slave station. But in such a case, the automatic equalizer must retry the initial pull-in control every time the automatic equalizer diverges. In order to retry the initial pull-in control, the training signal and the like must be exchanged via the line which is used in common by the plurality of slave stations $42_1$ through $42_M$. As a result, the transmission efficiency of the entire multi-point communication system deteriorates.

Accordingly, in order to avoid the transmission efficiency from deteriorating due to the retrying of the initial pull-in control, the conventional automatic equalizer carries out the initial pull-in control based on a received signal which is modulated by the transmission information, instead of using the training signal.

If the number of reference points in the signal space corresponding to the modulation technique of the received signal, the conventional automatic equalizer can obtain the reference signal $Z_n$ from the received signal which is modulated by the transmission information with a high reliability, because the distance between two reference points is long.

However, if a high-speed digital modulation technique with the transmission rate of 14.4 kbs is employed, the number of reference points becomes 128 and large. In this case, the distance between two reference points becomes short and the reliability of the reference signal $Z_n$ becomes poor. Consequently, the reliability of the reference error signal $E_n$, which is used as a reference for setting the coefficients in the transversal filter 31, also deteriorates. For this reason, there is a problem in that the initial pull-in control becomes unstable and difficult.

SUMMARY OF THE INVENTION

Accordingly, it is a general object of the present invention to provide a novel and useful automatic equalizer in which the problem described above is eliminated.

Another and more specific object of the present invention is to provide an automatic equalizer comprising transversal filter means, including delay means with N+1 taps and N+1 multipliers, for outputting an output signal $Y_n$ which is described by the following formula (A) depending on a modulated input signal $X_n$ which is received via a transmission path and a coefficient $C_i^{(n)}$ of each of the multipliers which are arranged in a sequence such that an integer i increases from $-(N/2)$ to $(N/2)$ towards latter stages of the delay means, $$Y_n = \sum_{i=-(N/2)}^{(N/2)} C_i^{(n)} \cdot X_{n-i-(N/2)} \quad (A)$$

gain control means, coupled to the transversal filter means, for multiplying a gain coefficient $g^{(n)}$ to the output signal $Y_n$ of the transversal filter means to produce an equalizer output, and control means, coupled to the gain control means and responsive to the equalizer output, for variably setting the coefficient $C_i^{(n)}$ of the transversal filter means described by the following formula (B) and the gain coefficient $g^{(n)}$ of the gain control means described by the following formula (C)

$$C_i^{(n+1)} = C_i^{(n)} + \alpha E_n^* X_{n-i-(N/2)} \quad (B)$$

$$g^{(n)} = g^{(n)} + \tau E_n^* Y_n \quad (C)$$

where $i \neq 0$, $E_n$ denotes an error of the output signal $Y_n$, $E_n^*$ denotes a complex conjugate of the error $E_n$, and $\alpha$ and $\tau$ denote scaler coefficients, so that a frequency distortion dependent on a transmission characteristic of the transmission path is compensated. According to the automatic equalizer of the present invention, an equalizing process is adaptively made with respect to the transmission characteristic, by converging the square values of errors in the frequency region and the amplitude region of the output signal of the transversal filter means to minimum values by independently applying the least means square (LMS) method. Hence, the variable control of the coefficients of the multipliers in the transversal filter means need only be made by taking into consideration only the frequency region. As a result, the control of the target values is simplified compared to the conventional case where the adaptive control is also made by varying the coefficients for the amplitude region. Furthermore, the initial pull-in control can be carried out stably and at a high speed because the automatic equalizer is less affected by an erroneous control caused by an erroneous detection of the input signal. Therefore, the reliability and performance of a multi-point communication can be improved when the present invention is applied thereto.

Other objects and further features of the present invention will be apparent from the following detailed description when read in conjunction with the accompanying drawings.

DESCRIPTION OF THE PREFERRED EMBODIMENTS

Figure 3:
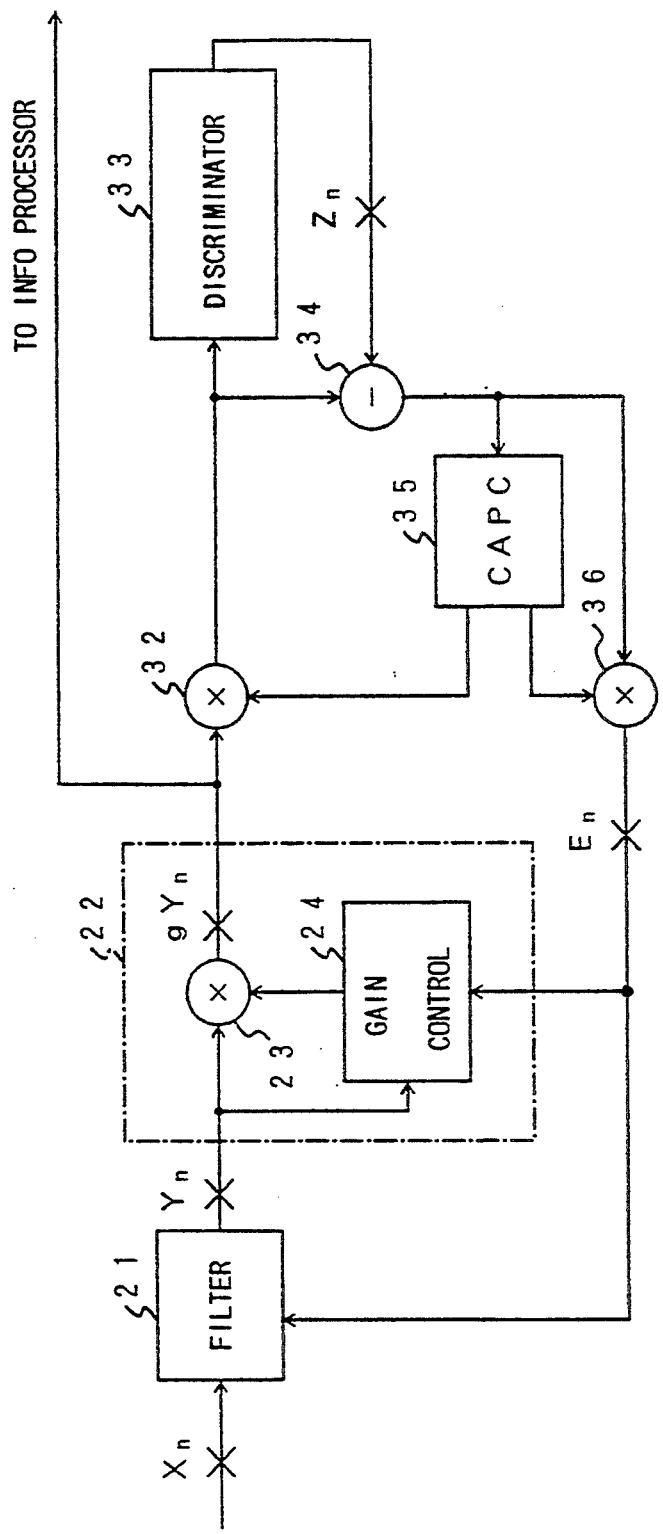
FIG. 3 is a system block diagram showing a first embodiment of an automatic equalizer according to the present invention.

A description will be given of a first embodiment of an automatic equalizer according to the present invention, by referring to FIG. 3. In FIG. 3, those parts which are essentially the same as those corresponding parts in FIG. 1 are designated by the same reference numerals, and a description thereof will be omitted.

Figure 1:
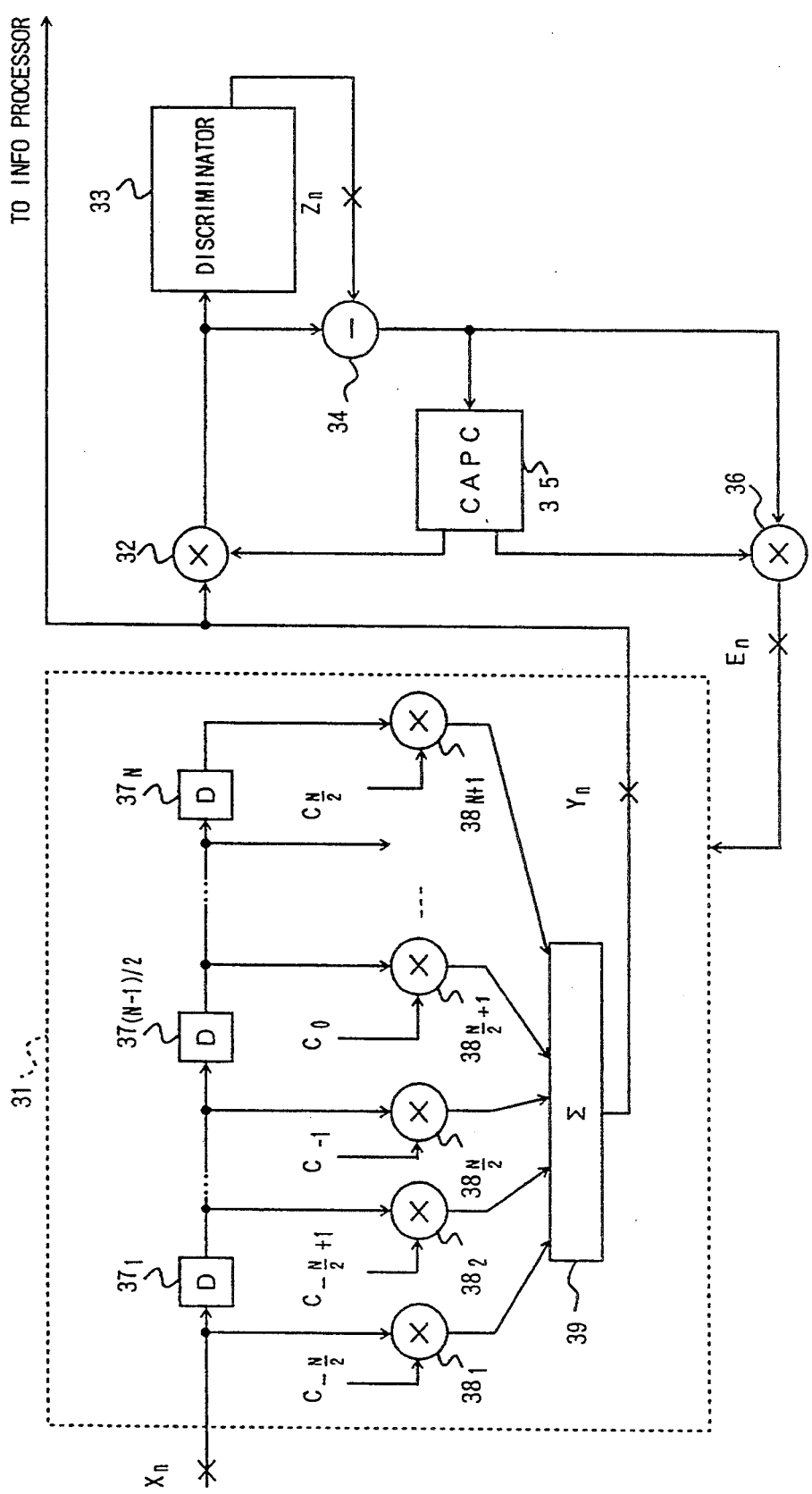
FIG. 1 is a system block diagram showing an example of a conventional automatic equalizer.
Figure 2:
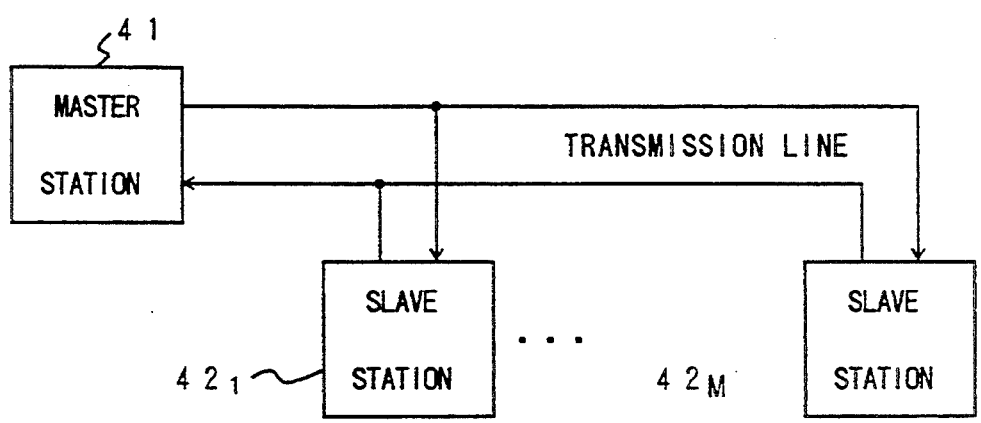
FIG. 2 is a system block diagram showing a multi-point communication system.

This embodiment differs from the conventional automatic equalizer shown in FIG. 1 in that a transversal filter 21 shown in FIG. 3 is used in place of the transversal filter 31, and that a gain controller 22 is interposed between an output of the transversal filter 21 and the input of the multiplier 32. The transversal filter 21 includes a plurality of delay elements, a plurality of multipliers and an adder which are connected similarly to the transversal filter 31. However, the method of setting the coefficients of the transversal filter 21 is different from that of the transversal filter 31.

The gain controller 22 includes a multiplier 23 and a gain control circuit 24. The output of the transversal filter 21 is connected to one input of the multiplier 23 and to one input of the gain control circuit 24. An output of the multiplier 23 is connected to one input of the multiplier 32. The output of the multiplier 36 is connected to the other input of the gain control circuit 24. An output of the gain control circuit 24 is connected to the other input of the multiplier 32.

Next, a description will be given of the operation of this embodiment.

The transversal filter 21 includes N+1 taps, and outputs an output signal $Y_n$. This output signal $Y_n$ can be described by the following formula (1) depending on the received signal $X_n$ and the coefficient $C_i^{(n)}$ of each of the multipliers which are coupled at the taps and are arranged within the transversal filter 21 in a sequence such that the integer i $(= -(N/2)$ to $(N/2))$ increases towards the latter stages of the corresponding delay elements.

$$Y_n = \sum_{i=-(N/2)}^{(N/2)} C_i^{(n)} \cdot X_{n-i-(N/2)} \quad (1)$$

In addition, a square error D which is defined by the square value of the reference error signal $E_n$ which is obtained at the output of the multiplier 36 depending on the output signal $Y_n$, can be described by the following formula (2) depending on the reference signal $Z_n$ which is obtained from the output of the discriminator 33.

$$D = (Y_n - Z_n)^2 \quad (2)$$

The formula (2) can be rewritten as the following formula (3) by substituting the formula (2) into the formula (1).

$$D = \left[ \sum_{i=-(N/2)}^{(N/2)} C_i^{(n)} \cdot X_{n-i-(N/2)} - Z_n \right]^2 \quad (3)$$

Because the square error D can be obtained by a second order equation of $C_i^{(n)}$, its value can be obtained by the following formula (4), where "*" denotes a complex conjugate.

$$\delta D/\delta C_i^{(n)} = 2E_n X_{n-i-(N/2)} \quad (4)$$

Hence, the square error D becomes a minimum at a point where the differential coefficient given by the formula (4) becomes "0".

In other words, in order to converge the value of the square error D to the minimum value regardless of the received signal $X_n$, the equalizing process which is successively carried out with respect to the subsequent received signals should use, for the coefficient $C_i^{(n)}$, a value which is obtained by subtracting the product a scaler K and the value of the formula (4) from the previously used coefficient $C_i^{(n)}$, as shown in the following recurrence formula (5), where $\alpha$ denotes a scaler coefficient which determines the speed of the above described convergence.

$$\begin{aligned} C_i^{(n+1)} &= C_i^{(n)} - K \cdot \delta D/\delta C_i^{(n)} \\ &= C_i^{(n)} - 2KE_n^* X_{n-i-(N/2)} \\ &= C_i^{(n)} + \alpha E_n^* X_{n-i-(N/2)} \end{aligned} \quad (5)$$

Accordingly, the multiplier which is provided at the center tap corresponding to the integer i of "0" sets the coefficient which is normalized by the absolute value of the right-hand term of the formula (5), as shown in the following recurrence formula (6).

$$C_0^{(n+1)} = (C_0^{(n)} + \alpha E_n^* X_{n-(N/2)}) \div |C_0^{(n)} + \alpha E_n^* X_{n-(N/2)}| \quad (6)$$

On the other hand, the multipliers which are provided at the other taps set the coefficients which are described by the following recurrence formula (7), and values given by $C_0^{(0)} = a + 0j$ $(a > 0)$ and $C_i^{(0)} = 0.0$ are used as initial values of the coefficients.

$$C_0^{(n+1)} = (C_0^{(n)} + \alpha E_n^* X_{n-i}) \quad (7)$$

In the transversal filter 21, only the coefficient $C_0^{(n+1)}$ of the center tap is set to the normalized value. The coefficients of the other taps are recursively set by the convergence algorithm based on the recurrence formula (7), so as to converge to relative values dependent on the coefficient of the center tap.

On the other hand, a square error d which is defined as the square value of the error with respect to the reference signal $Z_n$ of the output signal of the gain controller 22, can be described by the following formula (8) using a scaler gain coefficient $g^{(n)}$ which is multiplied to the output signal $Y_n$ by the multiplier 23.

$$d = (g^{(n)} Y_n - Z_n)^2 \quad (8)$$

As may be seen from the formula (8), the square error d can be given by a second order equation of the gain coefficient $g^{(n)}$. Hence the value of the square error d becomes a minimum at a point where the differential coefficient given by the following formula (9) becomes "0".

$$\delta d/\delta g^{(n)} = 2E_n^* Y_n \quad (9)$$

In other words, in order to converge the square error d to the minimum value regardless of the value of the output signal $Y_n$, the equalizing process which is successively carried out with respect to the subsequent received signals should use, for the gain coefficient $g^{(n)}$, a value which is obtained by multiplying a constant coefficient k to the value of the formula (9) based on the previously used gain coefficient.

Accordingly, the gain control circuit 24 inputs from the multiplier 36 the error $E_n$ between the output signal $Y_n$ and the reference signal $Z_n$, and sets the gain coefficient $g^{(n)}$ based on the algorithm which is given by the following recurrence formula (10) depending on the value of the error $E_n$, and uses "0" as the initial value $g^{(0)}$. In the formula (10), "Re" denotes the real number portion, and $\tau$ denotes a control coefficient which determines the convergence speed. However, at the initial pull-in control stage, this control coefficient $\tau$ is set to a small value so as to prevent an erroneous control of the coefficients of the transversal filter 21 due to the deviation of the gain coefficient $g^{(n)}$.

$$g^{(n)} = g^{(n)} - k \cdot Re[\delta d/\delta g^{(n)}] = g^{(n)} + \tau E_n^* Y_n \quad (10)$$

Therefore, out of the transmission distortions included in the output signal of the transversal filter 21, the gain controller 22 carries out a convergence process with respect to the amplitude component based on the least mean square (LMS) method so as to converge the amplitude component to a minimum value, and the transversal filter 21 carries out a convergence process with respect to the phase (frequency) component based similarly on the LMS method by variably setting the coefficients so as to converge the phase (frequency) component to a minimum value. In other words, this embodiment carries out an equalizing process adaptively to the initial pull-in control and the transmission characteristic. For this reason, the independent processes carried out in the gain controller 22 and the transversal filter 21 for controlling the respective target values are simplified because there is only a single target value for each process, and the response of the automatic equalizer is accordingly improved.

Hence, even if the equalizer characteristic diverges during the communication for some reason, this embodiment can carry out the initial pull-in control based on the received signal which is modulated by the transmission information, more stably and more quickly compared to the conventional automatic equalizer. In addition, the equalizer characteristic of this embodiment is stabilized with respect to the accuracy of the reference signal $Z_n$ which differs depending on the transmission rate and the signal arrangement in the signal space corresponding to the modulation technique.

If a desired accuracy and speed can be obtained at the time of setting the coefficients of the transversal filter 21, it is possible to use a constant value for the scaler coefficient $\alpha$, for example. In addition, the scaler coefficient $\alpha$ may be set by appropriately switching the value under a certain deciding reference during the process of the convergence control, for example.

The functions of the transversal filter 21, the gain controller 22 and the like of the first embodiment shown in FIG. 3 may be realized by software processing. That is, a central processing unit (CPU) which is coupled to a memory may carry out the operation of the first embodiment.

Figure 4:
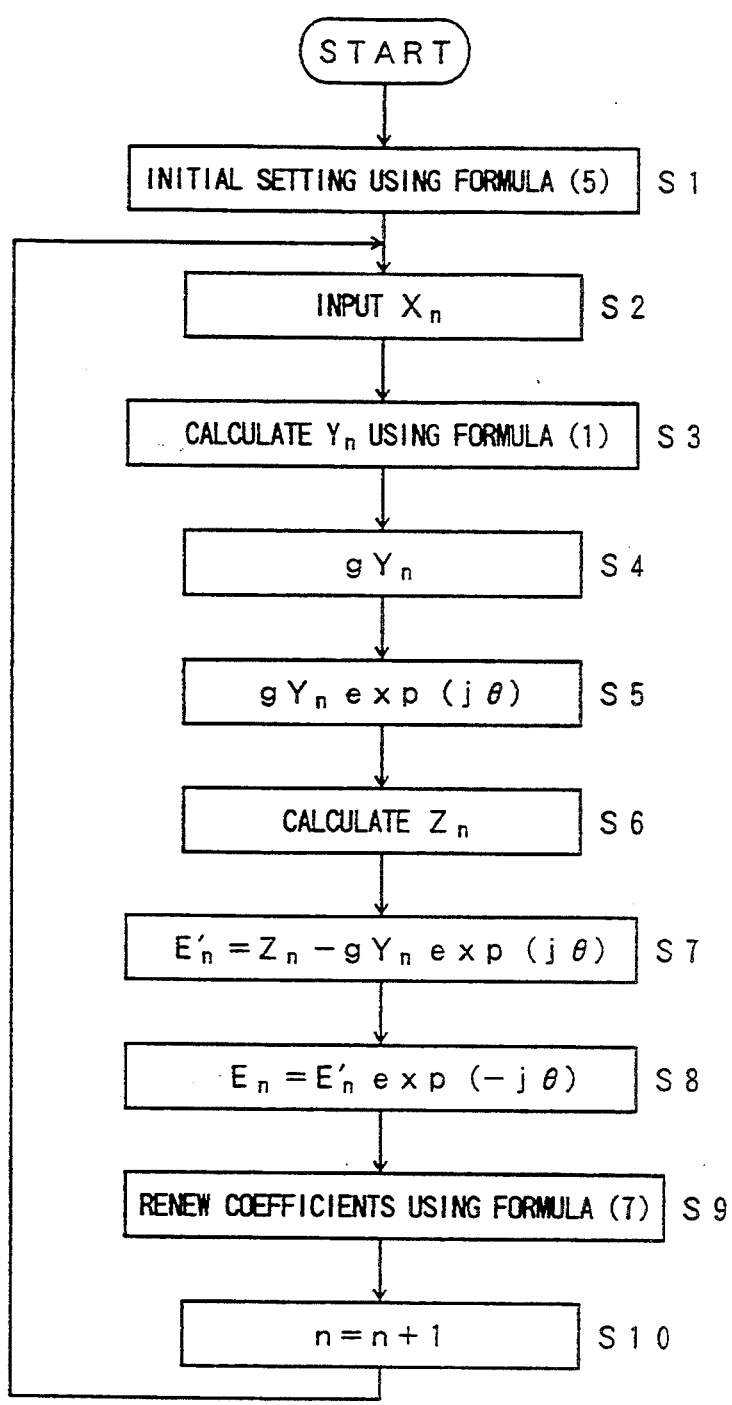
FIG. 4 is a flow chart for explaining the operation of the first embodiment.

FIG. 4 shows the operation of the first embodiment which is realized by software processing. In FIG. 4, a step S1 makes an initial setting by setting the coefficients $C_i$ according to the formula (5). A step S2 inputs the received signal $X_n$, and a step S3 calculates the output signal $Y_n$ of the transversal filter 21 according to the formula (1). A step S4 multiplies the gain coefficient g to the output signal $Y_n$ so as to carry out the function of the multiplier 23, and a step S5 makes a carrier phase correction to obtain $gY_n\exp(j\theta)$ so as to carry out the functions of the multiplier 32 and the CAPC 35. In addition, a step S6 calculates the reference point $Z_n$ so as to carry out the function of the discriminator 33.

Then, a step S7 calculates an equalizer error $E'_n$ based on $E'_n = Z_n - gY_n\exp(j\theta)$ so as to carry out the function of the subtractor 34. A step S8 corrects the phase of the equalizer error $E'_n$ based on $E_n = E'_n\exp(-j\theta)$ so as to carry out the functions of the multiplier 36 and the CAPC 35. In addition, a step S9 renews the coefficients $C_i$ of the transversal filter 21 and renews the gain coefficient g based on the formula (7). A step S10 increments n by one, and the process returns to the step S2.

Figure 5:
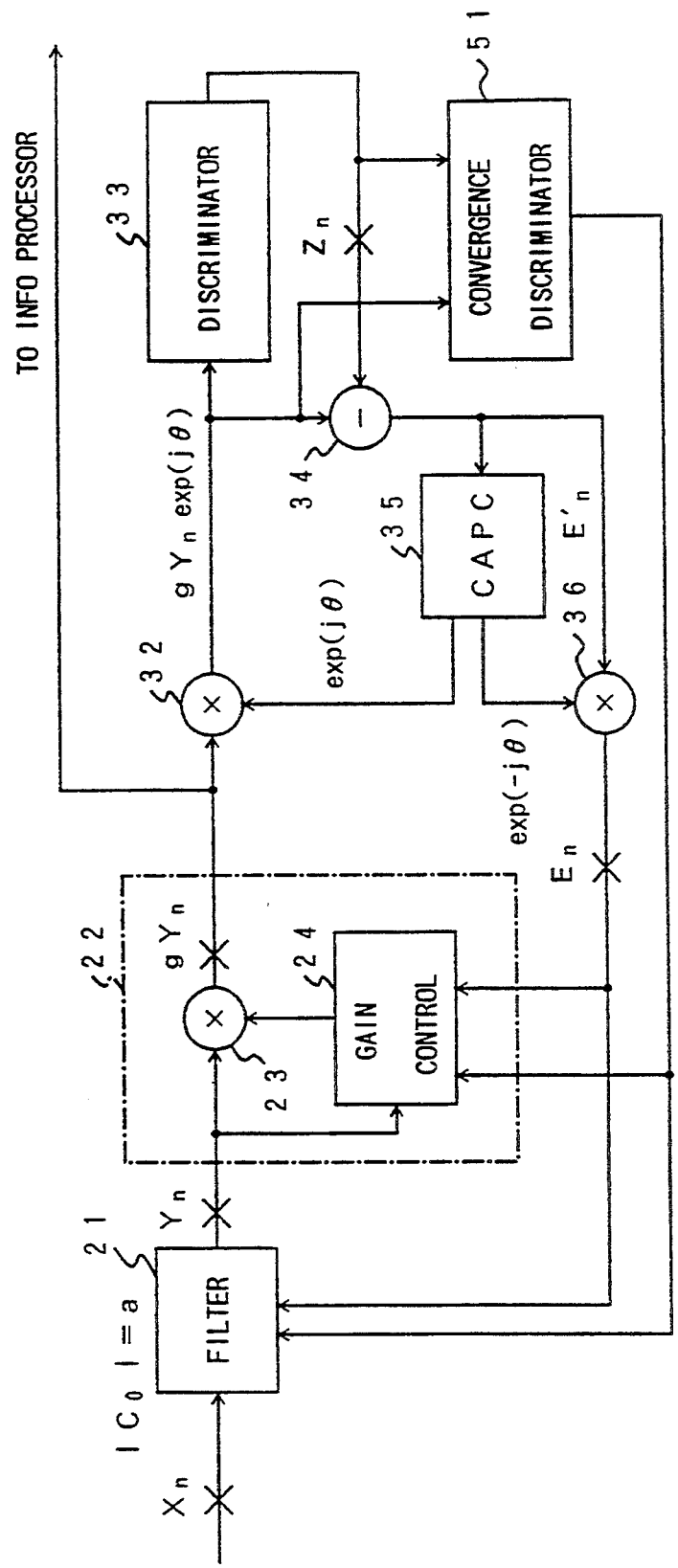
FIG. 5 is a system block diagram showing a second embodiment of the automatic equalizer according to the present invention.

Next, a description will be given of a second embodiment of the automatic equalizer according to the present invention, by referring to FIG. 5. In FIG. 5, those parts which are the same as those corresponding parts in FIG. 3 are designated by the same reference numerals, and a description thereof will be omitted.

The transversal filter 21 shown in FIG. 5 includes N+1 taps, and outputs an output signal $Y_n$. This output signal $Y_n$ can be described by the following formula (11) depending on the received signal $X_n$ and the coefficient $C_i$ of each of the multipliers (taps) which are arranged within the transversal filter 21 in a sequence such that the integer i (= $-(N/2)$ to $(N/2)$) increases towards the latter stages of the corresponding delay elements.

$$Y_n = \sum_{i=-(N/2)}^{(N/2)} C_i \cdot X_{n-i-(N/2)} \qquad (11)$$

In this case, a reference error signal $E_n$ output from the multiplier 36 can be described by the following formula (12), where $Z_n$ denotes the reference signal output from the discriminator 33.

$$E_n = Z_n - Y_n \qquad (12)$$
$$= Z_n - \sum_{i=-(N/2)}^{(N/2)} C_i \cdot X_{n-i-(N/2)}$$

However, at the initial pull-in control stage, a large error will occur because the gain coefficient g has not yet converged to a suitable value. Hence, in this embodiment, the control coefficient $\tau$ is initially set to a large value so as to renew the gain coefficient g at a high speed. Hence, only an error signal $P_n$ which describes the phase error between the signal $gY_n$ and the reference signal $Z_n$ is used for renewing the coefficients $C_i$ of the transversal filter 21, so as to make the transversal filter 21 insensitive with respect to the amplitude error. The error signal $P_n$ can be described by the following formula (13), where "$\| \ \|$" denotes a norm of the vector.

$$P_n = Y_n/\|Y_n\| - Z_n/\|Z_n\| \qquad (13)$$

Next, after the gain coefficient g converges to a certain extent, the control coefficient $\tau$ is reduced so as to slow down the renewal speed of the gain coefficient g. In addition, the coefficients $C_i$ of the transversal filter 21 are renewed using the normal error signal $E_n$ output from the multiplier 36. A convergence discriminator 51 shown in FIG. 5 discriminates whether or not the gain coefficient g has converged to the certain extent, based on the output signal $gY_n$ of the gain controller 22 and the reference signal $Z_n$ output from the discriminator 33. A discrimination result of this convergence discriminator 51 is supplied to the transversal filter 21 and to the gain controller 22.

The renewal of the coefficients $C_i$ of the transversal filter 21 and the gain coefficient g is thus carried out as follows based on the reference error signal $E_n$, where $C_0$ corresponds to the center tap, "*" denotes a complex conjugate, and $\tau_1 > \tau_2$.

1) Initial Setting:
   $C_i = 0.0$ (i ≠ 0)
   $C_0 = a + j0.0$ (a > 0)
2) Adaptive Algorithm (First Half of Pull-In)
   $C_i^{(n+1)} = C_i^{(n)} + \alpha P_n^* X_{n-i-(N/2)}$ (i ≠ 0)
   $C_0^{(n+1)} = [C_0^{(n)} + \alpha P_n^* X_{n-(N/2)}]/|C_0^{(n)} + \alpha P_n^* X_{n-(N/2)}|$
   $g^{(n+1)} = g^{(n)} + \tau_1 \text{Re}[E^* Y_n]$
3) Adaptive Algorithm (Latter Half of Pull-In)
   $C_i^{(n+1)} = C_i^{(n)} + \alpha E_n^* X_{n-i-(N/2)}$ (i ≠ 0)
   $C_0^{(n+1)} = [C_0^{(n)} + \alpha E_n^* X_{n-(N/2)}]/|C_0^{(n)} + \alpha E_n^* X_{n-(N/2)}|$
   $g^{(n+1)} = g^{(n)} + \tau_2 \text{Re}[E^* Y_n]$ For example, the convergence discriminator 51 discriminates that the gain coefficient g has converged to the certain extent if a difference between an average power of the signal $gY_n$ and the average power of the reference signal $Z_n$ becomes smaller than a preset threshold value. Hence, it is possible to switch the algorithm from the algorithm 2) to the algorithm 3) based on the discrimination result output from the convergence discriminator 51.

The functions of the transversal filter 21, the gain controller 22, the convergence discriminator 51 and the like of the second embodiment shown in FIG. 5 may be realized by software processing. That is, a central processing unit (CPU) which is coupled to a memory may carry out the operation of the second embodiment.

Figure 6:
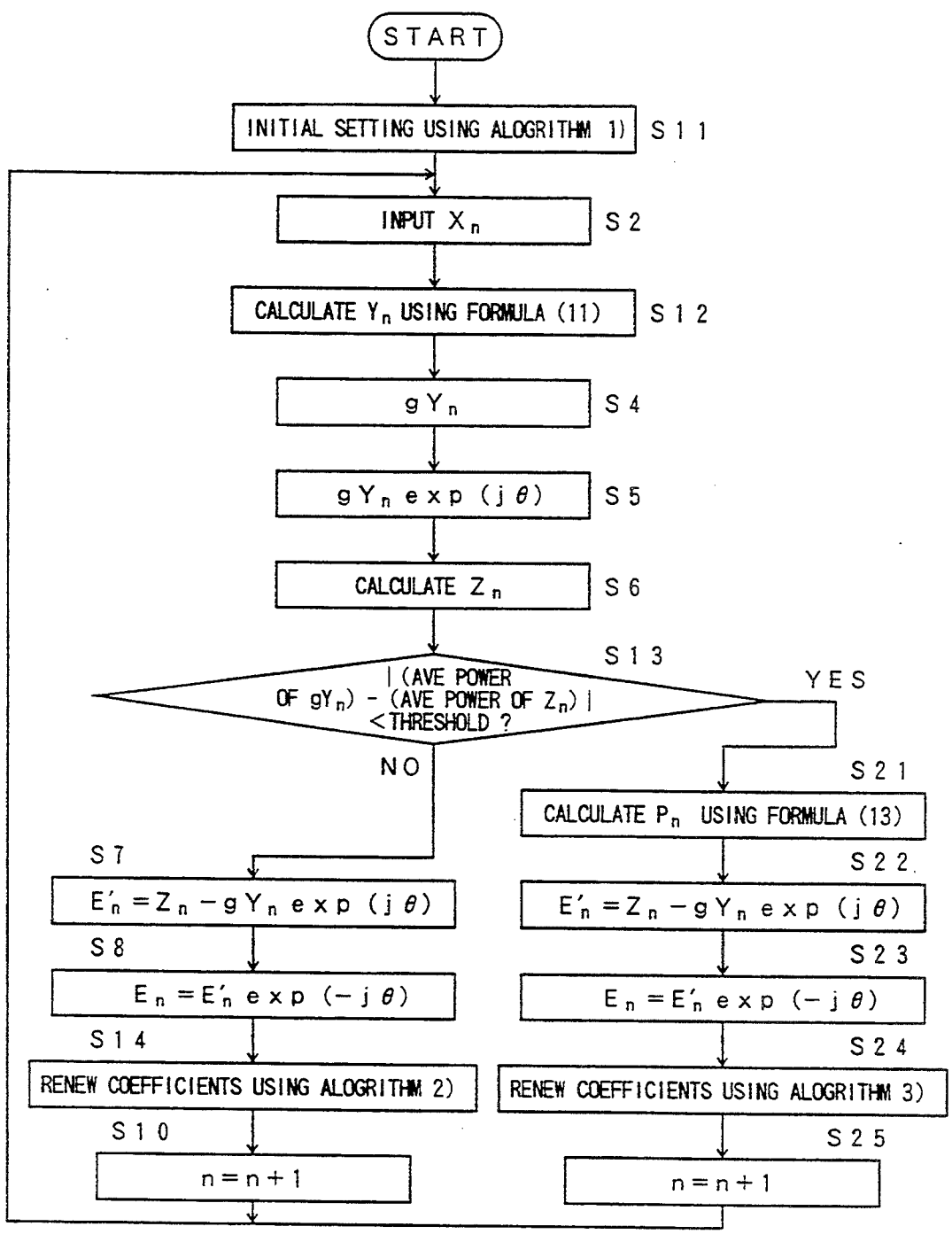
FIG. 6 is a flow chart for explaining the operation of the second embodiment.

FIG. 6 shows the operation of the second embodiment which is realized by software processing. In FIG. 6, those steps which are the same as those corresponding steps in FIG. 4 are designated by the same reference numerals, and a description thereof will be omitted.

In FIG. 6, a step S11 makes an initial setting by setting the coefficients $C_i$ according to the algorithm 1) described above. After the step S2, a step S12 calculates the output signal $Y_n$ of the transversal filter 21 according to the formula (11). Then, after carrying out the steps S4 through S6, a step S13 decides whether or not |(average power of $gY_n$) − (average power of $Z_n$)| < (preset threshold value).

If the decision result in the step S13 is NO, a step S14 renews the coefficients $C_i$ of the transversal filter 21 and renews the gain coefficient g based on the algorithm 2) described above. The step S10 increments n by one, and the process returns to the step S2.

On the other hand, if the decision result in the step S13 is YES, a step S21 calculates the phase error signal $P_n$ based on the formula (13). Then, a step S22 calculates the equalizer error $E'_n$ and a step S23 corrects the phase of the equalizer error $E'_n$, similarly to the step S7 and S8 described above. In addition, a step S24 renews the coefficients $C_i$ of the transversal filter 21 and renews the gain coefficient g based on the algorithm 3) described above. A step S25 increments n by one, and the process returns to the step S2.

Further, the present invention is not limited to these embodiments, but various variations and modifications may be made without departing from the scope of the present invention.

What is claimed is:

1. An automatic equalizer comprising:

transversal filter means, including delay means with N+1 taps and N+1 multipliers, for outputting an output signal $Y_n$ which is described by the following formula (A) depending on a modulated input signal $X_n$ which is received via a transmission path and a coefficient $C_i^{(n)}$ of each of the multipliers which are arranged in a sequence such that an integer i increases from $-(N/2)$ to $(N/2)$ towards latter stages of the delay means;

$$Y_n = \sum_{i=-(N/2)}^{(N/2)} C_i^{(n)} \cdot X_{n-i-(N/2)} \quad (A)$$

gain control means, coupled to said transversal filter means, for multiplying a gain coefficient $g^{(n)}$ to the output signal $Y_n$ of said transversal filter means to produce an equalizer output; and control means, coupled to said gain control means and responsive to the equalizer output, for variably setting the coefficient $C_i^{(n)}$ of said transversal filter means described by the following formula (B) and the gain coefficient $g^{(n)}$ of said gain control means described by the following formula (C)

$$C_i^{(n+1)} = C_i^{(n)} + \alpha E_n^* X_{n-i-(N/2)} \quad (B)$$

$$g^{(n)} = g^{(n)} + \tau E_n^* Y_n \quad (C)$$

where $i \neq 0$, $E_n$ denotes an error of the output signal $Y_n$, $E_n^*$ denotes a complex conjugate of the error $E_n$, and $\alpha$ and $\tau$ denote scaler coefficients, so that a frequency distortion dependent on a transmission characteristic of the transmission path is compensated, wherein said gain control means includes a gain control circuit for variably setting the gain coefficient $g^{(n)}$ based on the output signal $Y_n$ of said transversal filter means and the error $E_n$ which is output from said control means, and a multiplier which multiplies the gain coefficient $g^{(n)}$ which is set by said gain control circuit to the output signal $Y_n$ of said transversal filter means.

2. The automatic equalizer as claimed in claim 1, wherein $C_0^{(0)}$ is initially set to $a+0j$ and $C_i^{(0)}$ is initially set to 0.0, where $a>0$.

3. The automatic equalizer as claimed in claim 1, wherein said control means includes:

a first multiplier, coupled to said gain control means, outputting a rotation signal by shifting a phase of the equalizer output by $\theta$ radians depending on phase error information $\exp(j\theta)$;

a discriminator, coupled to said first multiplier, outputting a reference signal $Z_n$ which indicates a reference point which is closes to the rotation signal out of all reference points in a signal space which is dependent on a modulation technique used to modulate the input signal $X_n$;

a subtractor, coupled to said first multiplier and said discriminator, outputting an error signal $E'_n$ which indicates an error of the rotation signal with reference to the reference signal $Z_n$;

a carrier adaptive phase controller, coupled to said substrator, outputting the phase error information $\exp(j\theta)$ and inverted phase error information $\exp(-j\theta)$ based on the error signal $E'_n$; and a second multiplier, coupled to said subtractor and said carrier adaptive phase controller, outputting the error signal $E_n$ by shifting a phase of the error signal $E'_n$ by $-\theta$ radians depending on the inverted phase error information $\exp(-j\theta)$.

4. The automatic equalizer as claimed in claim 3, wherein said control means further includes:

convergence discriminator means, coupled to said first multiplier and said discriminator, for distinguishing a first portion of a pull-in control stage of the automatic equalizer from a second portion of the pull-in control stage based on the rotation signal and the reference signal $Z_n$, and for controlling said gain control means so that a renewal speed of the gain coefficient $g^{(n)}$ within said gain control means is faster during the first portion of the pull-in control stage compared to the second portion of the pull-in control stage.

5. The automatic equalizer as claimed in claim 4, wherein said convergence discriminator means further controls said transversal filter means so that the coefficient $C_i^{(n)}$ is variably set depending solely on a phase error between the equalizer output and the reference signal $Z_n$.

6. The automatic equalizer as claimed in claim 4, wherein said convergence discriminator means detects the first portion of the pull-in control stage if an absolute value of a difference between average powers of the equalizer output and the reference signal $Z_n$ is less than a preset threshold value.

7. The automatic equalizer as claimed in claim 1, wherein said control means includes convergence discriminator means for distinguishing a first portion of a pull-in control stage of the automatic equalizer from a second portion of the pull-in control stage based on the equalizer output $g_{(n)}Y_n$ and a reference signal $Z_n = E_n + Y_n$, and for controlling said gain control means so that a renewal speed of the gain coefficient $g^{(n)}$ within said gain control means is faster during the first portion of the pull-in control stage compared to the second portion of the pull-in control stage.

8. The automatic equalizer as claimed in claim 7, wherein said convergence discriminator means further controls said transversal filter means so that the coefficient $C_i^{(n)}$ is variably set depending solely on a phase error between the equalizer output and the reference signal $Z_n$.

9. The automatic equalizer as claimed in claim 7, wherein said convergence discriminator means detects the first portion of the pull-in control stage if an absolute value of a difference between average powers of the equalizer output and the reference signal $Z_n$ is less than a preset threshold value.

10. An automatic equalizer comprising:

transversal filter means, including delay means with N+1 taps and N+1 multipliers, for outputting an output signal depending on a modulated input signal which is received via a transmission path and a coefficient $C_i^{(n)}$ of each of the multipliers which are arranged in a sequence such that an integer i increases from $-(N/2)$ to $(N/2)$ towards latter stages of the delay means;

gain control means, coupled to said transversal filter means, for multiplying a gain coefficient $g^{(n)}$ to the output signal of said transversal filter means to produce an equalizer output; and control means, coupled to said gain control means and responsive to the equalizer output, for variably setting the coefficient $C_i^{(n)}$ of said transversal filter means and the gain coefficient $g^{(n)}$ of said gain control means, so that a frequency distortion dependent on a transmission characteristic of the transmission path is compensated, wherein said gain control means includes a gain control circuit for variably setting the gain coefficient $g^{(n)}$ based on the output signal $Y_n$ of said transversal filter means and the error $E_n$ which is output from said control means, and a multiplier which multiplies the gain coefficient $g^{(n)}$ which is set by said gain control circuit to the output signal $Y_n$ of said transversal filter means.

* * * * *